(12) United States Patent
Spengler et al.

(10) Patent No.: US 9,944,391 B2
(45) Date of Patent: Apr. 17, 2018

(54) SYSTEM AND METHOD FOR ESTABLISHING A WIRELESS CONNECTION USING A SELF-POSITIONABLE WIRELESS DEVICE

(71) Applicant: MOTOROLA SOLUTIONS, INC., Schaumburg, IL (US)

(72) Inventors: Charles E. Spengler, Hoffman Estates, IL (US); Randy L. Ekl, Lake Zurich, IL (US); Daniel S. Griesmann, Villa Park, IL (US); Lee M. Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 101 days.

(21) Appl. No.: 15/202,001

(22) Filed: Jul. 5, 2016

(65) Prior Publication Data
US 2018/0009526 A1    Jan. 11, 2018

(51) Int. Cl.
| | |
|---|---|
| *B64C 39/02* | (2006.01) |
| *H04B 7/06* | (2006.01) |
| *G05D 1/10* | (2006.01) |
| *H04B 7/04* | (2017.01) |
| *H04W 4/02* | (2018.01) |

(Continued)

(52) U.S. Cl.
CPC .......... *B64C 39/024* (2013.01); *B64C 39/022* (2013.01); *G05D 1/0011* (2013.01); *G05D 1/101* (2013.01); *H04B 7/04* (2013.01); *H04B 7/0617* (2013.01); *H04J 11/00* (2013.01); *H04W 4/027* (2013.01); *H04W 4/046* (2013.01);

(Continued)

(58) Field of Classification Search
CPC .................. G05D 1/101; G05D 1/104; G05D 2201/0207; G08G 5/0069; G08G 5/025; H04W 16/00; H04W 24/02; H04W 4/028; H04W 84/06; H04W 84/18; G01S 5/02
See application file for complete search history.

(56) References Cited

U.S. PATENT DOCUMENTS

| | | |
|---|---|---|
| 7,624,951 B1 | 12/2009 | Kraft et al. |
| 8,193,983 B1 | 6/2012 | Farmer |

(Continued)

*Primary Examiner* — Dale Moyer
(74) *Attorney, Agent, or Firm* — Michael Best & Friedrich LLP

(57) ABSTRACT

A system and method for a providing a dynamic backhaul. In one example, the system includes a self-positionable wireless device (for example, a drone) including a dual-band radio configured to establish a wireless connection between the self-positionable wireless device and a wireless system. The dual-band radio initiates a narrowband wireless link with the wireless system via a first narrowband antenna of the self-positionable wireless device and a second narrowband antenna of the wireless system. A navigation system generates location, velocity and error estimate of the self-positionable wireless device. The location is transmitted to the wireless system using the narrowband wireless link. The self-positionable wireless device receives via the narrowband wireless link location, velocity and error estimate of the wireless system. The self-positionable wireless device establishes a directional broadband wireless link with the wireless system using the location, velocity and error estimate of the self-positionable wireless system and the wireless system.

20 Claims, 5 Drawing Sheets

(51) Int. Cl.
*H04J 11/00* (2006.01)
*H04W 4/04* (2009.01)
*G05D 1/00* (2006.01)
H04W 88/08 (2009.01)
H04W 88/12 (2009.01)

(52) U.S. Cl.
CPC ....... *B64C 2201/122* (2013.01); *H04W 88/08* (2013.01); *H04W 88/12* (2013.01)

(56) References Cited

U.S. PATENT DOCUMENTS

| | | |
|---|---|---|
| 9,119,061 B2 | 8/2015 | Mohamadi |
| 2006/0094449 A1* | 5/2006 | Goldberg .............. H04W 16/28 455/456.6 |
| 2011/0215985 A1 | 9/2011 | Kaplan et al. |
| 2017/0029107 A1* | 2/2017 | Emami ................. B64C 39/024 |
| 2017/0041895 A1* | 2/2017 | Gan ................. H04W 56/0035 |

* cited by examiner

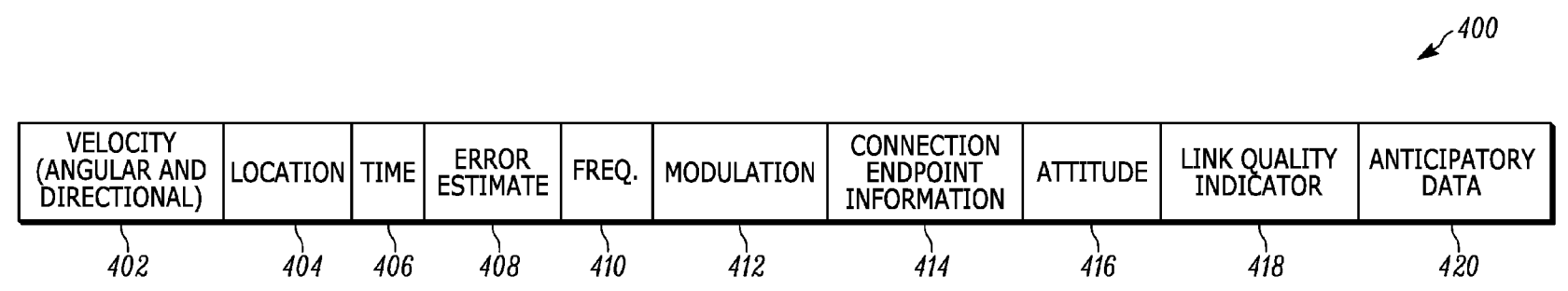

| VELOCITY (ANGULAR AND DIRECTIONAL) | LOCATION | TIME | ERROR ESTIMATE | FREQ. | MODULATION | CONNECTION ENDPOINT INFORMATION | ATTITUDE | LINK QUALITY INDICATOR | ANTICIPATORY DATA |
|---|---|---|---|---|---|---|---|---|---|
| 402 | 404 | 406 | 408 | 410 | 412 | 414 | 416 | 418 | 420 |

FIG. 4

SYSTEM AND METHOD FOR ESTABLISHING A WIRELESS CONNECTION USING A SELF-POSITIONABLE WIRELESS DEVICE

BACKGROUND

Vehicle breakdowns, accidents, natural disasters, and other incidents (for example large civic events such as concerts, professional games, protests, etc.) may occur such that public safety personnel (for example, police officers, firefighters, and the like) may be brought to an incident area to respond to or otherwise help with the incident. During such incidents, network congestion may prevent users of mobile communication devices in the incident area from reliably communicating. Additionally, control and access channels from the incident area are often implemented using public infrastructure, which often has a relatively low service level expectation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 shows a message packet communicated by the self-positionable wireless device in accordance with some embodiments.

Figure 1:
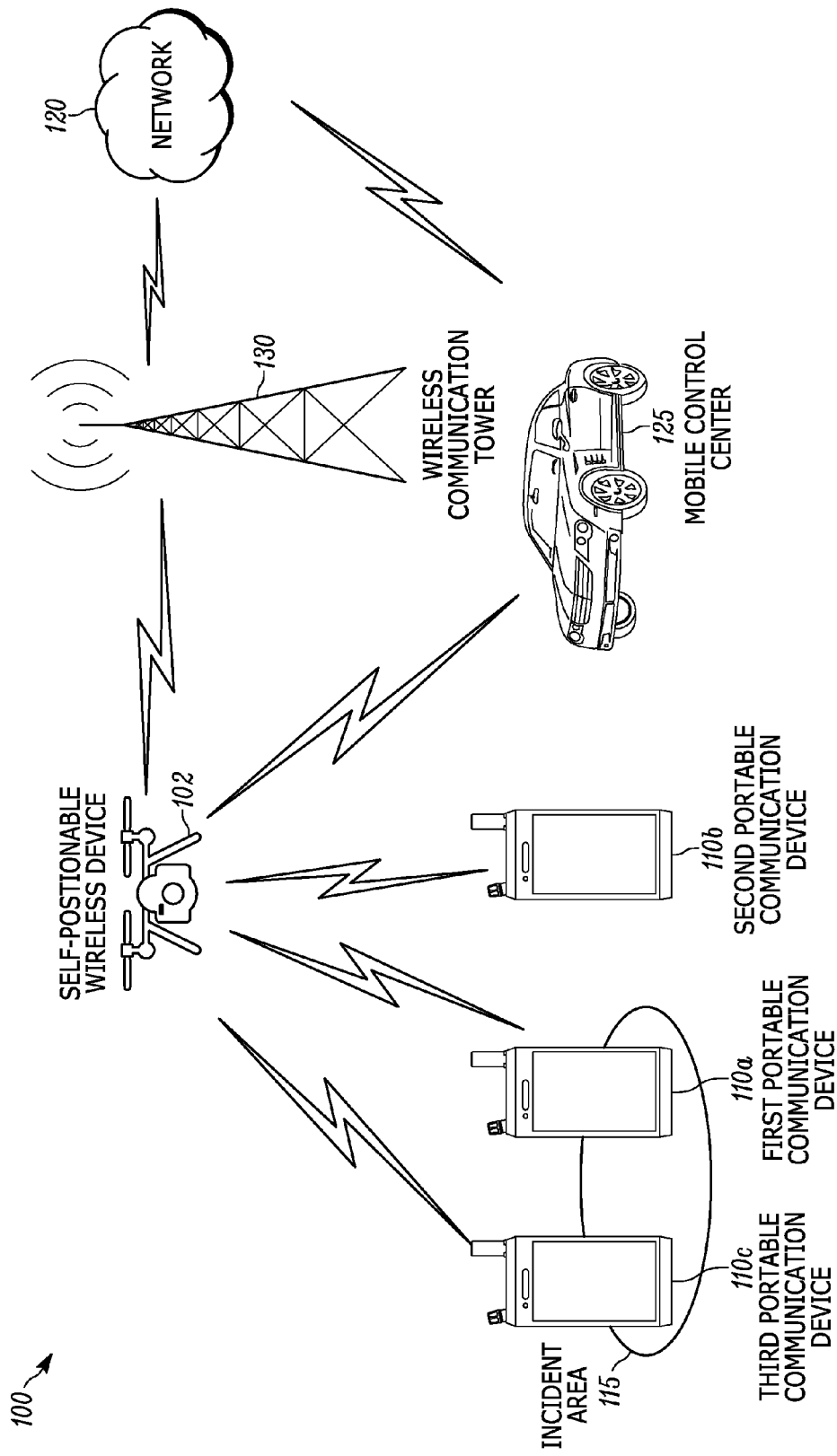
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a self-positionable wireless device. The self-positionable wireless device includes a dual-band radio configured to establish a wireless connection between the self-positionable wireless device and a wireless system. The self-positionable wireless device also includes a dual-band radio that is configured to initiate a narrowband wireless link with the wireless system via a narrowband antenna of the self-positionable wireless device and a narrowband antenna of the wireless system. The self-positionable wireless device also includes a navigation system configured to generate a first location, a first velocity and a first error estimate of the self-positionable wireless device, the first location, the first velocity, and the first error estimate transmitted to the wireless system using the narrowband wireless link. The self-positionable wireless device is configured to receive via the narrowband wireless link with the wireless system, a second location, a second velocity and a second error estimate of the wireless system. The self-positionable wireless device is further configured to establish a directional broadband wireless link with the wireless system using the first and second location, the first and second velocity, and the first and second error estimate. This directional broadband wireless link may be established with a second type of antenna of the self-positionable device and a second type of antenna of the wireless system. The dual-band radio is configured to dynamically adjust a beam direction and width to maintain the directional broadband wireless link.

Another exemplary embodiment provides a method of establishing a wireless connection between a first self-positionable wireless device and a wireless system. The method comprises establishing with the first self-positionable wireless device, a narrowband wireless link via a narrowband antenna of the first self-positionable wireless device and a narrowband antenna of the wireless system. The method also includes generating with the first self-positionable wireless device, a first location, a first velocity, a first error estimate of the first self-positionable wireless device via a navigation system of the first self-positionable wireless device. The method also includes transmitting with the first self-positionable wireless device, the first location, the first velocity and the first error estimate to the wireless system using the narrowband wireless link. The method includes receiving via the narrowband wireless link with the wireless system, a second location, a second velocity and a second error estimate of the wireless system. The method also includes establishing with the first self-positionable wireless device using the first and second location, the first and second velocity, the first and second error estimate, a directional broadband wireless link with the wireless system.

FIG. 1 is a block diagram of a communication system 100 according to one exemplary embodiment. Alternative embodiments may include more or fewer of each of the components described herein, may combine some components, or may include other alternative components. The communication system 100 includes a self-positionable wireless device 102, a network 120, a mobile control center 125, and a wireless communication tower 130. In one exemplary embodiment, the self-positionable wireless device 102 is an unmanned aerial vehicle. In one exemplary embodiment, the self-positionable wireless device 102 is a tethered aerial vehicle. Such vehicles are sometimes referred to as "drones". The system 100 also includes a plurality of portable communication devices. In the example illustrated in FIG. 1, a first portable communication device $110_A$, a second portable communication device $110_B$, and a third portable communication device $110_C$ are shown. In the following description, when explaining how a single portable communication device functions, a reference to portable communication device 110 is used. In addition, when discussing a group of portable communication devices, reference to a plurality of portable communication devices $110_A$ through $110_N$ is used. The subscript N indicates that the plurality of portable communication devices may include more or fewer devices than illustrated in FIG. 1. The first portable communication device 110$_A$, and the third portable communication device 110$_C$ are located within an incident area 115. The second portable communication device 110$_E$ is located outside the incident area 115. Additional portable communication devices may be located inside the incident area 115 or outside the incident area 115. In the example shown in FIG. 1, the self-positionable wireless device 102 provides a backhaul connection to the network 120 for wireless traffic generated by portable communication device 110 and the mobile control center 125. In other embodiments, multiple self-positionable wireless devices 102 provide the backhaul connection to the network 120. In some embodiments, the mobile control center 125 may be located inside the incident area. In some embodiments, the perimeter and the size of the incident area may depend on the number of self-positionable wireless devices 102 that may be available for providing a backhaul connection to network 120.

The portable communication devices 110$_A$, 110$_B$, and 110$_C$, the mobile control center 125, and the wireless communication tower 130 communicate with each other and to the network 120 using the self-positionable wireless device 102. The network 120 may be a wired or a wireless communication network. All or parts of the network 120 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 120 may also include future developed networks. Although FIG. 1 shows only one of each of the self-positionable wireless device 102, the mobile control center 125, and the wireless communication tower 130, additional drones, mobile control centers, and wireless communication towers may be included in the communication system 100 and these devices and components may communicate over the network 120. In the example shown in FIG. 1, the mobile control center 125 may be configured to wirelessly communicate with the network 120. In some embodiments, the self-positionable wireless device 102 may communicate with other external devices over the network 120. In some embodiments, the self-positionable wireless device 102, the plurality of portable communication devices 110$_A$ through 110$_N$, the mobile control center 125, the wireless communication tower 130, and other external devices may communicate with each other using other networks or through direct links, for example, a two-way radio channel. In some embodiments, the self-positionable wireless device 102 may communicate with one or more self-positionable wireless devices (not shown) that are configured to communicate with a wireless communication tower (not shown) or with the network 120.

As illustrated in FIG. 1, the portable communication device 110 may be a handheld communication device, such as a mobile telephone, mobile radio, smart watch or other smart wearable, or other portable device configured to communicate over the network 120. In some embodiments, the portable communication device 110 may be a tracking device that is placed on a person, on an object, or at a location within the incident area 115. The mobile control center 125 may refer to communication devices within a vehicle or other mobile means (for example, communication devices within a backpack), respectively that are used to communicate with other devices over the network 120. For example, the mobile control center 125 may be a mountable communication device installed in a police vehicle or in a backpack used by public safety personnel.

Figure 2:
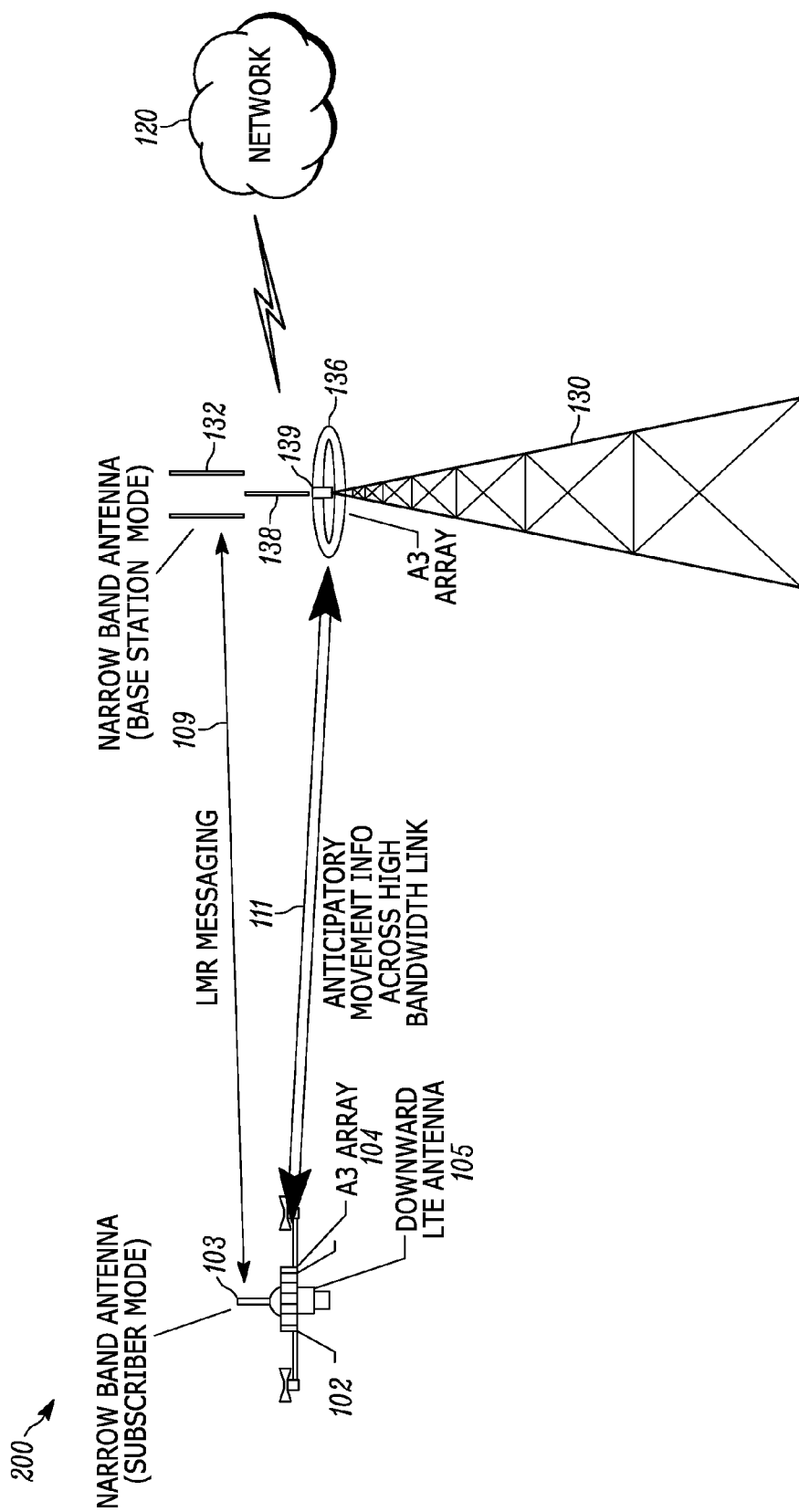
FIG. 2 is a block diagram of a dynamically deployed backhaul system in accordance with some embodiments.

FIG. 2 is a block diagram of a dynamic backhaul system 200 in accordance with some embodiments. In the example shown, the dynamic backhaul system 200 includes one self-positionable wireless device 102 that can wirelessly communicate with the wireless communication tower 130 using a narrowband wireless link 109 and a directional broadband wireless link 111. In some embodiments, the self-positionable wireless device 102 includes a narrowband antenna 103 (for example, a first type of antenna), an agile aperture array (A3) antenna 104 (for example a second type of antenna), and a Long Term Evolution (LTE) antenna 105. The wireless communication tower 130 shown in FIG. 2 includes a narrowband receive antenna 132, a narrow band transmit antenna 138, a broadband antenna 136 and an inertial motion unit 139. In some embodiments, the narrowband antenna 103 is configured to operate in a subscriber mode and the narrowband antenna 132 is configured to operate in a base station mode. In some embodiments, the broadband antennae 104 and 136 include an agile aperture array (A3) antenna. In some embodiments, the agile aperture array (A3) antennae may be a software defined electrically reconfigurable antenna. In some embodiments, an inertial motion unit 139 integrated with the agile aperture array (A3) antennae. The inertial motion unit 139 is configured to determine the amount by which the object it is attached to is turning or moving in free space. In an example, the inertial motion unit 139 generates the location, velocity and error estimate data associated with wireless communication tower 130.

Figure 3:
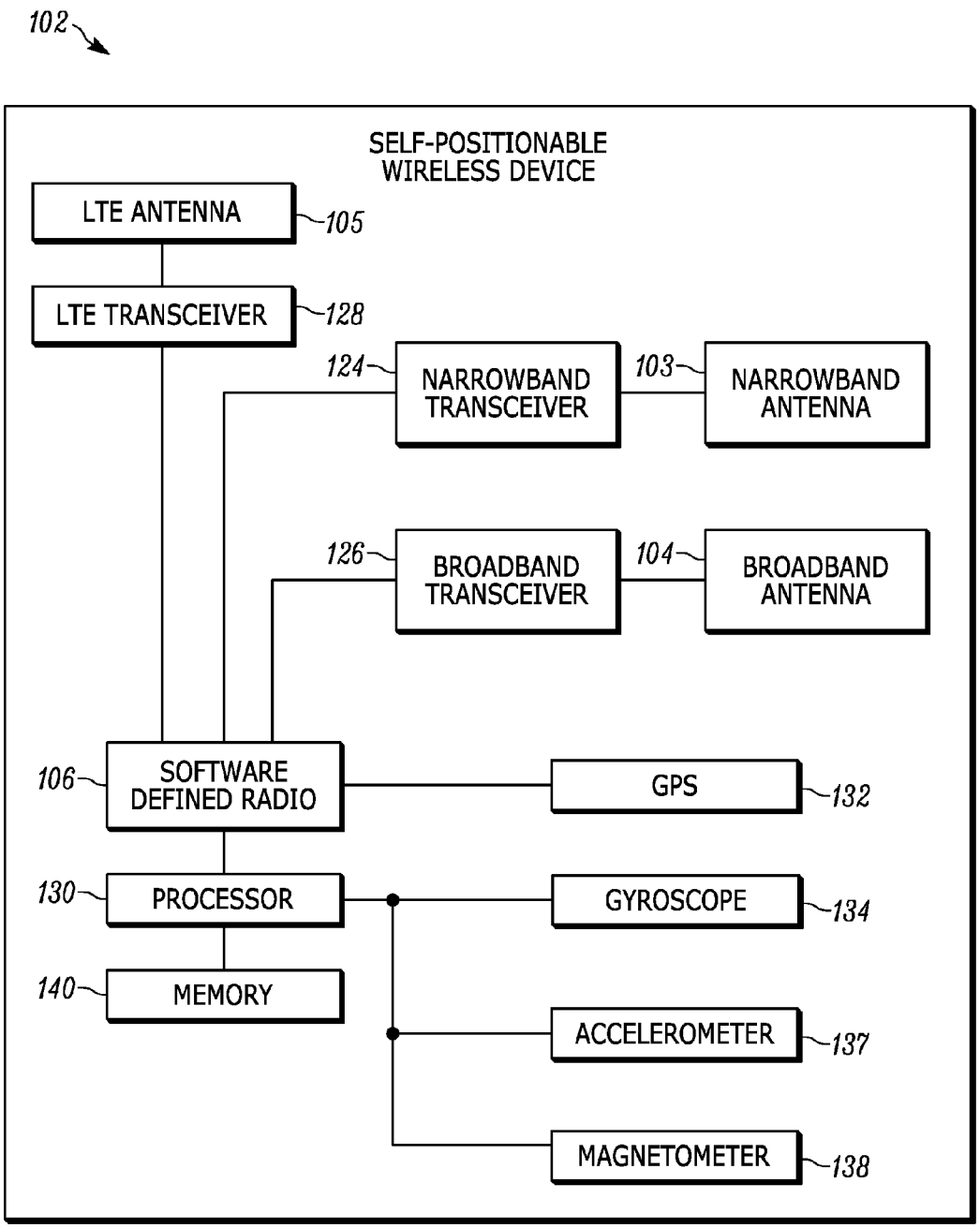
FIG. 3 is a block diagram a self-positionable wireless device used for a dynamic backhaul system in accordance with some embodiments.

FIG. 3 is a block diagram of the self-positionable wireless device 102 used for a dynamic backhaul system in accordance with some embodiments. Alternative embodiments may include more or fewer of each of the components described herein, may combine some components, or may include other alternative components. The self-positionable wireless device 102 includes an electronic processor 130, a memory 140, a software defined radio 106, a global positioning system (GPS) unit 132, a gyroscope 134, an accelerometer 137, a magnetometer 138, a narrowband antenna 103, a narrowband transceiver 124, a broadband antenna 104, a broadband transceiver 126, a Long Term Evolution (LTE) transceiver 128 and a Long Term Evolution (LTE) antenna 105. The processor 130 is coupled to the software defined radio 106, the global positioning system (GPS) unit 132, the gyroscope 134, the accelerometer 137, and the magnetometer 138 and the memory 140. The software defined radio 106 is coupled to narrowband transceiver 124, which is coupled to narrrowband antenna 103. The software defined radio 106 is coupled to broadband transceiver 126, which is coupled to broadband antenna 104. The software defined radio 106 is also coupled to Long Term Evolution (LTE) transceiver 128, which is coupled to Long Term Evolution (LTE) Antenna 105.

FIG. 4 illustrates a message packet 400 communicated by the self-positionable wireless device 102 to the wireless communication tower 130 using either the narrowband wireless link 109 or the directional broadband wireless link 111, in accordance with some embodiments. The message packet 400 may include the fields 402 through 418 that contain data related to various parameters that affect the directional broadband wireless link 111. In an example, the field 402 includes data associated with the velocity of the self-positionable wireless device 102. In some embodiments, the field 402 includes both angular and directional velocity data. In an example, the field 404 includes data associated with the location of the self-positionable wireless device 102. In some embodiments, the data associated with the location of the self-positionable wireless device 102 in the field 404 may be received from at least one of the global positioning system 132, the gyroscope 134, the accelerometer 137 and the magnetometer 138. In an example, the field 406 includes information such as a time stamp associated with data being transferred between the self-positionable wireless device 102 and the wireless communication tower 130. In an example, the field 408 includes an error estimate related to the expected position and velocity of the self-positionable wireless device 102 in comparison the actual position of the self-positionable wireless device 102. In an example, the field 410 includes data associated with the frequency used by the antennae in the self-positionable wireless device 102 and the wireless communication tower 130. In an example, the field 412 includes data associated with modulation of the wireless signals transferred between the self-positionable wireless device 102 and the wireless communication tower 130. In an example, the field 414 includes connection endpoint data. In some embodiments, the connection endpoint data includes cryptographic data that allows for the self-positionable wireless device 102 and the wireless system to perform identification and authentication of each other prior to establishing a directional broadband wireless link 111. In some embodiments, the connection endpoint data includes a drone identification data and/or a network identification data. In an example, the field 416 includes data related to the attitude of the self-positionable wireless device 102. In an example, the field 418 includes a link quality indicator that data associated with the quality of the directional broadband wireless link 111. In some embodiments, the link quality indicator in field 418 may be used for establishing the directional broadband wireless link 111. In some embodiments, the link quality indicator in the field 418 may be used for maintaining the directional broadband wireless link 111. In an example, the field 420 includes anticipatory data of the self-positionable wireless device 102. The anticipatory data in field 420 includes anticipated movement information of the self-positionable wireless device 102. In some embodiments, the anticipatory movement information is calculated using at least one of the location of the self-positionable wireless device 102, the velocity of the self-positionable wireless device 102, a wind speed, a tether length, a tether anchor position, and an attitude associated with the self-positionable wireless device 102.

Figure 5:
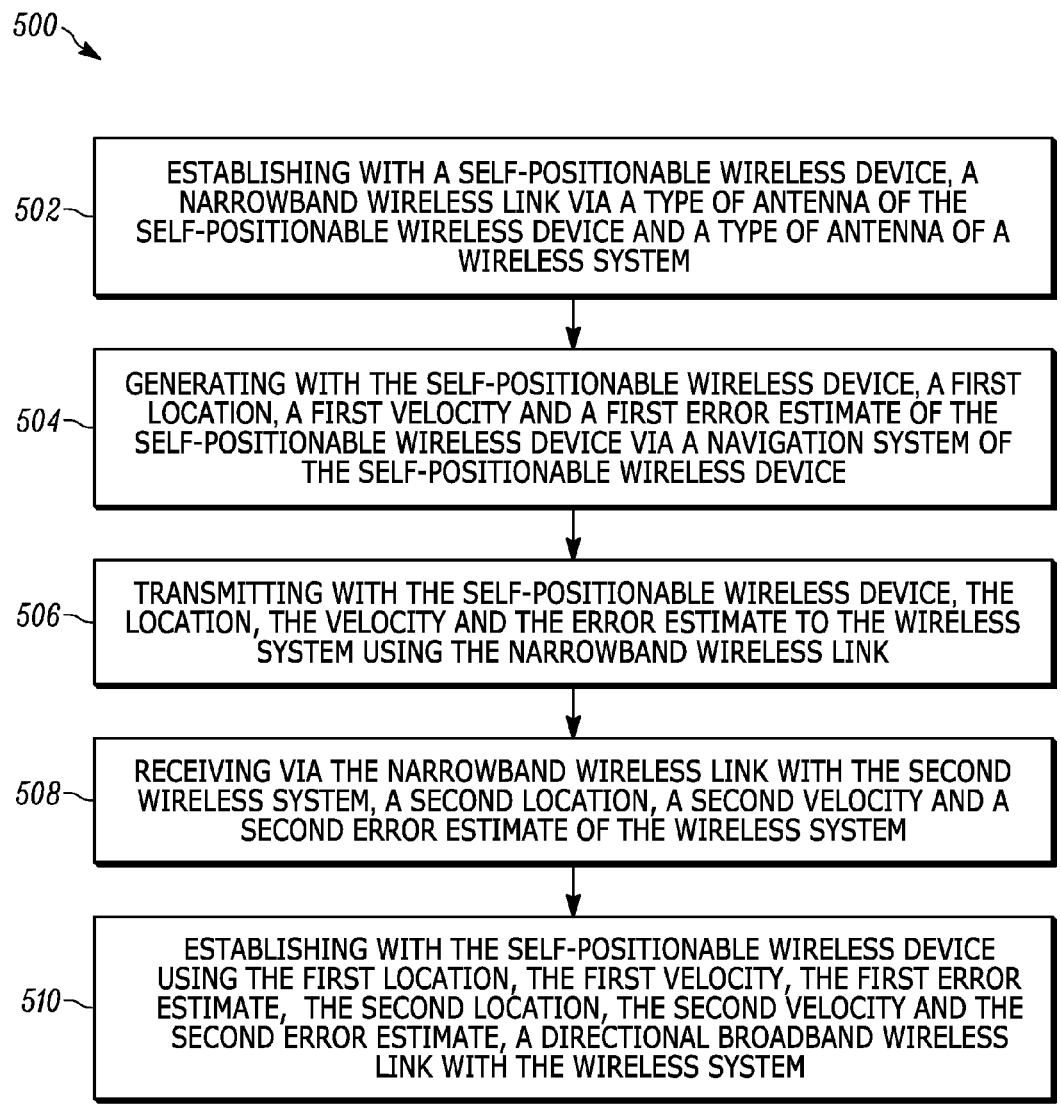
FIG. 5 is a flow chart of a method of operation of a dynamically deployed backhaul using a self-positionable wireless device in accordance with some embodiments.

FIG. 5 is a flow chart of a method 500 of operation of the backhaul dynamically deployed using a self-positionable wireless device 102 in accordance with some embodiments. In the example illustrated, the method 500 establishes a wireless connection between the self-positionable wireless device 102 and another wireless system.

At block 502, the self-positionable wireless device 102 establishes a narrowband wireless link 109 with a wireless system. In an example, the self-positionable wireless device 102 comprises a drone. In an example, the wireless system may include a broadband fixed-end base station. In an example, the narrowband wireless link 109 is established between a drone and a mobile control center 125, a wireless communication tower 130, another drone, or a command center (not shown). In some embodiments, the narrowband wireless link 109 provides a communication link that may be used for land mobile radio (LMR) messaging. In an example, the wireless system includes a wireless communication tower 130 (FIG. 2). As shown in FIG. 2, the narrowband wireless link 109 is established between a narrowband antenna 103 in the self-positionable wireless device 102 and the narrowband antenna 132 associated with wireless communication tower 130.

At block 504, the self-positionable wireless device 102 is configured to determine its position in free space. In one example, data related to the location, the velocity and an error estimate related to the self-positionable wireless device 102 is generated using a navigation system included in the self-positionable wireless device 102. In some embodiments, the navigation system includes one or more of the global positioning system (GPS) 132, the gyroscope 134, the accelerometer 137 and the magnetometer 138. In some embodiments, the location information is contained in a field 404 contained within a message packet 400 (shown in FIG. 4). In some embodiments, the velocity information is contained in a field 402 contained within the message packet 400. In some embodiments, the error estimate is contained in a field 408 contained within the message packet 400. Thus, there is a transfer or exchange of data (for example, location, velocity and an error estimate of the self-positionable wireless device) via the narrowband wireless link 109.

At block 506, the self-positionable wireless device 102 transmits the location information of the self-positionable wireless device 102 to the wireless system using the narrowband wireless link 109.

At block 508, the self-positionable wireless device 102 receives data related to the location, the velocity and the error estimate related to the wireless system that is generated by inertial motion unit 139. The generated data, by the inertial motion unit 139, related to the location, the velocity and the error estimate of the wireless system is sent via the narrowband wireless link 109 established with self-positionable wireless device 102.

At block 510, the self-positionable wireless device 102 establishes a directional broadband wireless link 111 with the wireless system. The directional broadband wireless link 111 is established using the location, the velocity and the error estimate data of the self-positionable wireless device 102 and the location, velocity and the error estimate data of the wireless system. Once the directional broadband wireless link 111 is established the location, velocity and error estimate data of the self-positionable wireless device 102 and the wireless system is communicated using the directional broadband wireless link 111. When the quality of the directional broadband wireless link 111 deteriorates below a threshold level, the method 400 reverts back to communicating the location, velocity and error estimate data of the self-positionable wireless data 102 and the wireless system using the narrowband wireless link 109. Following which, when the quality of the directional broadband wireless link 111 improves and comes to be within an acceptable range of signal-to-noise ratio, the method 400 reverts back to communicating the location, velocity and error estimate data of the self-positionable wireless data 102 and the wireless system using the broadband wireless link 111. In some embodiments, the directional broadband wireless link 111 is used for sending anticipatory movement data of the self-positionable wireless device 102 to the wireless system (such as a wireless communication tower 130). The broadband link 111 is established using the agile aperture array (A3) antenna 104 at the self-positionable wireless device 102 and the agile aperture array (A3) antenna 136 at the wireless communication tower 130. In some embodiments, the beam direction and/or beam width of the at least one of the array antenna 104 and the agile aperture array (A3) antennae 136 may be dynamically adjusted to maintain the directional broadband wireless link (in other words, dynamic adjusting of the beam direction occurs). In some embodiments dynamically adjusting beam direction and/or beam width to maintain the directional broadband wireless link includes ensuring that the highest possible bandwidth that may be available for the directional broad wireless link is achieved. In some embodiments dynamically adjusting beam direction and/or beam width to maintain the directional broadband wireless link includes determining and using the lowest possible transmit power that may be used for the directional broad wireless link. The agile aperture array (A3) antennae 104 is configured to be able to shift the direction of the transmission beam dynamically based on computation performed by the processor 130 in the self-positionable wireless device 102. In some embodiments, the beam width of the agile aperture array (A3) antennae 104, 136 is increased or reduced based on the level of interference and noise characteristic of the broadband link established between the self-positionable wireless device 102 and the wireless system. In some embodiments, the beam width of agile aperture array (A3) antennae 104, 136 is increased or reduced based on either the attitude change or the attitude stability of the self-positionable wireless device 102 and/or the wireless system. In some embodiments, the beam width associated with the agile aperture array (A3) antenna 104, 136 is determined based on at least one a first location data, a first velocity data, and a first error estimate data associated with the self-positionable wireless device 102 and a second location data, a second velocity data, and a second error estimate data associated with the wireless system. In some embodiments, the beam width of the agile aperture array (A3) antennae 104, 136 is dynamically adjusted to compensate for angular instability of the self-positionable wireless device 102.

In some embodiments, the method 500 includes exchanging, via the narrowband wireless link, a data associated with one or more of a velocity, a location, an error estimate, frequency, modulation, channel width, channel capacity, and a connection endpoint data of the self-positionable wireless device 102. In some embodiments, the method 500 includes exchanging, via the narrowband wireless link, a data associated with one or more of a velocity, a location, an error estimate, frequency, modulation, channel width, channel capacity, and a connection endpoint data of the wireless system. In some embodiments, the method 500 includes calculating anticipatory data using at least one of the location and velocity of the self-positionable wireless device 102, a wind speed, a tether length, a tether anchor position, and an attitude of the self-positionable wireless device 102. In some embodiments, the method 500 includes sending and receiving anticipatory data between the self-positionable wireless device and the wireless system using one of the narrowband wireless link and the directional broadband wireless link.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of establishing a wireless connection between a self-positionable wireless device and a wireless system, the method comprising:
   establishing with the self-positionable wireless device, a narrowband wireless link via a first narrowband antenna of the self-positionable wireless device and a second narrowband antenna of the wireless system;
   generating with the self-positionable wireless device, a first location, a first velocity and a first error estimate of the self-positionable wireless device via a navigation system of the self-positionable wireless device;
   transmitting with the self-positionable wireless device, the first location, the first velocity and the first error estimate to the wireless system using the narrowband wireless link;
   receiving via the narrowband wireless link with the wireless system, a second location, a second velocity and a second error estimate of the wireless system; and
   establishing with the self-positionable wireless device using the first location, the first velocity, the first error estimate, the second location, the second velocity, and the second error estimate, a directional broadband wireless link with the wireless system.

2. The method of claim 1, further comprising:
   dynamically adjusting a beam direction of a second type of antenna of the self-positionable wireless device and maintaining the directional broadband wireless link.

3. The method of claim 1, further comprising:
   dynamically adjusting a beam width of a second type of antenna of the self-positionable wireless device and maintaining the directional broadband wireless link.

4. The method of claim 2, wherein the beam direction associated with the second type of antenna is determined based on the first location, the first velocity, the first error estimate, the second location, the second velocity, and the second error estimate.

5. The method of claim 3, wherein the beam width associated with the second type of antenna is determined based on the first location, the first velocity, the first error estimate, the second location, the second velocity, and the second error estimate.

6. The method of claim 1, further comprising:
   exchanging, via the narrowband wireless link, a data associated with at least one selected from the group consisting of velocity, location, error estimate, frequency, modulation, channel width, channel capacity and connection endpoint data of the self-positionable wireless device.

7. The method of claim 1, further comprising:
   exchanging, via the narrowband wireless link, a data associated with at least one selected from the group consisting of velocity, location, error estimate, frequency, modulation, channel width, channel capacity and connection endpoint data of the wireless system.

8. The method of claim 1 further comprising:
   calculating anticipatory data using at least one selected from the group consisting of the first location, the first velocity, a wind speed, a tether length, a tether anchor position, and an attitude.

9. The method of claim 1, further comprising:
   sending and receiving anticipatory data between the self-positionable wireless device and the wireless system using one of the narrowband wireless link and the directional broadband wireless link.

10. The method of claim 1, wherein the wireless system is selected from the group consisting of a broadband fixed-end base station, a mobile control center and a drone.

11. A self-positionable wireless device comprising:
    a dual-band radio configured to establish a wireless connection between the self-positionable wireless device and a wireless system, the dual-band radio configured to initiate a narrowband wireless link with the wireless system via a first narrowband antenna of the self-positionable wireless device and a second narrowband antenna of the wireless system;
    a navigation system configured to generate a first location, a first velocity and a first error estimate of the self-positionable wireless device, the first location transmitted to the wireless system using the narrowband wireless link;
    wherein the self-positionable wireless device is configured to receive via the narrowband wireless link with the wireless system, a second location, a second velocity and a second error estimate of the wireless system; and
    wherein the self-positionable wireless device is configured to establish a directional broadband wireless link with the wireless system using the first location, the first velocity, the first error estimate, the second location, the second velocity and the second error estimate.

12. The self-positionable wireless device of claim 11 includes a drone.

13. The self-positionable wireless device of claim 11, further comprising a second type of antenna and wherein the directional broadband wireless link is established via the second type of antenna.

14. The self-positionable wireless device of claim 13, wherein the second type of antenna includes an agile aperture array (A3) antenna.

15. The self-positionable wireless device of claim 14, wherein the agile aperture array (A3) antenna includes a software defined electrically reconfigurable antenna.

16. The self-positionable wireless device of claim 11, wherein the dual-band radio configured to establish the wireless connection between the self-positionable wireless device and a broadband fixed-end base station.

17. The self-positionable wireless device of claim 11, wherein the dual-band radio configured to establish the wireless connection between the self-positionable wireless device and a second self-positionable wireless device.

18. The self-positionable wireless device of claim 11, wherein the dual-band radio configured to establish the wireless connection between the self-positionable wireless device and a mobile control center.

19. The self-positionable wireless device of claim 11, wherein the dual-band radio is configured to dynamically adjust a beam direction to maintain the directional broadband wireless link.

20. The self-positionable wireless device of claim 19, wherein the dual-band radio is configured to dynamically adjust a beam width to compensate for angular instability of the self-positionable wireless device.

* * * * *